(12) United States Patent
Ashdown et al.

(10) Patent No.: US 8,568,010 B2
(45) Date of Patent: Oct. 29, 2013

(54) HYBRID ILLUMINATION SYSTEMS AND METHODS

(75) Inventors: Ian Ashdown, West Vancouver (CA); Philippe M. Schick, Vancouver (CA); Ingo Speier, Victoria (CA); Wallace Scott, Victoria (CA)

(73) Assignee: Cooledge Lighting Inc., Burnaby (CA)

( * ) Notice: Subject to any disclaimer, the term of this patent is extended or adjusted under 35 U.S.C. 154(b) by 104 days.

(21) Appl. No.: 13/328,211

(22) Filed: Dec. 16, 2011

(65) Prior Publication Data

US 2012/0155078 A1   Jun. 21, 2012

Related U.S. Application Data

(60) Provisional application No. 61/424,027, filed on Dec. 16, 2010.

(51) Int. Cl.
*F21S 8/00* (2006.01)

(52) U.S. Cl.
USPC ............. 362/576; 359/598; 362/20; 362/147; 362/234; 362/235; 362/249.02; 362/555

(58) Field of Classification Search
USPC ............ 359/591–598; 362/20, 147, 234, 235, 362/249.02, 555, 576
See application file for complete search history.

(56) References Cited

U.S. PATENT DOCUMENTS

| | | | | |
|---|---|---|---|---|
| 4,246,477 | A | | 1/1981 | Latter |
| 4,260,220 | A | * | 4/1981 | Whitehead .................... 385/133 |
| 4,394,860 | A | | 7/1983 | Smith |
| 4,720,170 | A | | 1/1988 | Learn, Jr. |
| 5,661,839 | A | | 8/1997 | Whitehead |
| 6,272,265 | B1 | * | 8/2001 | Franklin .......................... 385/31 |
| 6,679,617 | B1 | | 1/2004 | Custodis et al. |
| 6,840,645 | B2 | | 1/2005 | Eisenman et al. |
| 8,000,014 | B2 | | 8/2011 | Whitehead et al. |
| 2006/0007549 | A1 | * | 1/2006 | Zincone ......................... 359/591 |
| 2008/0158855 | A1 | | 7/2008 | Fanton et al. |
| 2010/0039799 | A1 | | 2/2010 | Levens |
| 2010/0296081 | A1 | * | 11/2010 | Granqvist ...................... 356/213 |
| 2011/0146662 | A1 | | 6/2011 | Dehlsen et al. |

FOREIGN PATENT DOCUMENTS

WO    WO-02/025032    3/2002

OTHER PUBLICATIONS

Whitehead et al., "Using Core Sunlighting to Improve Illumination Quality and Increase Energy Efficiency of Commercial Buildings," Proceedings of the ASME 4th International Conference on Energy Sustainability, pp. 1-8 (May 17-22, 2010).
International Search Report and Written Opinion mailed Feb. 9, 2012 for International Application No. PCT/CA2011/050779 (9 pages).

* cited by examiner

*Primary Examiner* — Nimeshkumar Patel
*Assistant Examiner* — Steven Horikoshi
(74) *Attorney, Agent, or Firm* — Bingham McCutchen LLP

(57) ABSTRACT

In accordance with certain embodiments, interior spaces are illuminated with a combination of harvested sunlight and artificial light emitted by one or more light-emitting elements.

21 Claims, 5 Drawing Sheets

HYBRID ILLUMINATION SYSTEMS AND METHODS

RELATED APPLICATION

This application claims the benefit of and priority to U.S. Provisional Patent Application No. 61/424,027, filed Dec. 16, 2010, the entire disclosure of which is hereby incorporated herein by reference.

FIELD OF THE INVENTION

The present invention generally relates to hybrid illumination devices and methods, and more specifically to combined illumination systems and methods featuring both sunlight and light-emitting elements such as light-emitting diodes.

BACKGROUND

Daylight-harvesting systems that redirect sunlight into building cores have been utilized to provide interior lighting for many years. However, it has proved difficult to supplement the harvested sunlight, e.g., during night or periods of inclement weather, with other sources of illumination without interfering with the efficient transfer of the sunlight into the interior space and/or consuming valuable "real estate" from which the sunlight shines into such spaces. Similarly, the illumination of objects such as artwork and jewelry in display cases is often made difficult by the viewer casting shadows on the objects. In some situations where lighting internal to a display case is used, frames for the case may be bulky, or dimensions of the case may not be ideal for optimum viewing.

Various conventional systems for such applications incorporate linear fluorescent lighting when, e.g., there is insufficient daylight to illuminate an office space. However, linear fluorescent lamps typically have a toroidal luminous intensity distribution, which requires the light guide in the vicinity of the lamps to be lined with an opaque reflective material in order to efficiently couple the emitted light to the diffusers and into the illuminated office space below. Such coatings may compromise the overall efficiency of the illumination system, particularly the sunlight-harvesting portion. Thus, there is a need for efficient hybrid illumination systems that improve upon conventional daylight-harvesting systems, as well as systems utilized for other illumination and/or display applications.

SUMMARY

Embodiments of the present invention form and/or improve upon hybrid illumination systems by utilizing one or more (and typically an array of) small light-emitting elements disposed between a human or machine observer or another light source and the object to be observed or illuminated. Typically, the illumination sources are barely noticeable due to their small size, which is comparable to the diameter of a human hair, typically 20 µm-180 µm. The light sources therefore block, or only partially block, a small fraction of the field of view of the object, scene or zone to be illuminated or viewed. The sources, while intervening, generally have a low fill-factor in terms of blocking the field of view of interest. Blocking may be complete at a given point, or it may be merely a reduction in observed or detected light due to partial absorption by the illuminating elements. The light sources may be positioned on or close to the viewer's line of sight, such that light emitted from them is approximately coaxial with the viewer's line of sight. Further, the light sources may be placed close to the viewer's eye(s) and/or the object itself. In a specific embodiment, the light-emitting elements may be applied to building core daylight-illumination (i.e., sunlight-harvesting) systems to thus supplement them with electric lighting. Thus, the light-emitting elements are generally in line with another, variable light source such as the daylight reflector.

The term "light-emitting element" (or "LEE") is defined as any device that emits electromagnetic radiation at a wavelength or within a wavelength regime of interest, for example, a visible, infrared or ultraviolet regime, when activated, by applying a potential difference across the device and/or passing a current through the device. Examples of LEEs include solid-state, organic, polymer, phosphor-coated or high-flux LEDs, laser diodes, and other similar devices as would be readily understood. The emitted radiation of an LEE may be visible, such as red, blue, or green, or invisible, such as infrared or ultraviolet. An LEE may produce radiation of a spread of wavelengths. An LEE may include a phosphorescent or fluorescent material for converting a portion of its emissions from one set of wavelengths to another. An LEE may include multiple LEEs, each emitting essentially the same or different wavelengths. An LEE may also feature an optic that redirects light emitted by the semiconductor die in preferred directions. The optic may be a refractive or diffractive optical element that is molded or embossed onto the die or its supporting (typically transparent) substrate. A lateral dimension of the optic may be, e.g., less than or approximately equal to the spacing between LEEs (within an array of LEEs), for example between approximately 1 mm and approximately 10 mm.

A LEE may be of any size. In some embodiments, a LEE has one lateral dimension less than 500 µm. Exemplary sizes of a LEE may include about 250 µm by about 600 µm, about 250 µm by about 400 µm, about 250 µm by about 300 µm, or about 225 µm by about 175 µm. In some embodiments, a LEE includes or consists essentially of a small LED die, also referred to as a "microLED." A microLED generally has one lateral dimension less than about 300 µm. In some embodiments, the LEE has one lateral dimension less than about 200 µm or even less than about 100 µm. For example, a microLED may have a size of about 225 µm by about 175 µm or about 150 µm by about 100 µm or about 150 µm by about 50 µm. In some embodiments, the surface area of the top surface of a microLED is less than 50,000 µm$^2$ or less than 10,000 µm$^2$.

While LEEs have been used as examples of elements that may be used in embodiments of the present invention, other semiconductor die may also be used instead of or in addition to such devices. For example, photovoltaic cells (for example single junction or multijunction cells), transistors, photodiodes, laser diodes, resistors, capacitors, non-emitting diodes, and/or sensors may be utilized. As used herein, "phosphor" refers to any material that shifts the wavelength of light irradiating it and/or that is luminescent, fluorescent, and/or phosphorescent. Phosphors may be in the form of powders or particles and in such case may be mixed in binders, e.g., silicone. As used herein, phosphor may refer to the powder or particles or to the powder or particles plus binder.

In an aspect, embodiments of the invention feature a hybrid illumination system including or consisting essentially of a light guide, an extraction element, and one or more light-emitting elements for emitting artificial light. The light guide guides sunlight from a first region of the light guide to a second region thereof having an emission surface. The light guide confines the sunlight via total internal reflection, and at least a portion of the sunlight is extracted from the light guide to exit through the emission surface. The extraction element disrupts the total internal reflection of sunlight confined in the light guide, thereby extracting sunlight through the emission surface. The one or more light-emitting elements are disposed over the emission surface, thereby blocking or reflecting at least a portion of the sunlight extracting from the light guide.

Embodiments of the invention include one or more of the following in any of a variety of combinations. The one or more light-emitting elements may be disposed on a substantially transparent substrate. The substrate may be disposed on the emission surface. The substrate may include or consist essentially of glass and/or a substantially transparent polymeric material. The polymeric material may include or consist essentially of polyethylene terephthalate. The polymeric material may include or consist essentially of polymethylmethylacrylate, polystyrene, polyester, and/or polycarbonate. The light guide may include an optical film for diffusing and/or redirecting extracted sunlight. The optical film may be disposed on the emission surface and/or on the substantially transparent substrate. A cross-section of the light guide (e.g., substantially perpendicular to the emission surface) may be substantially circular or substantially rectangular (e.g., square). At least one (or even all) of the light-emitting elements may include or consist essentially of a light-emitting diode (e.g., a substantially unpackaged light-emitting diode die). A controller may control the intensity of the artificial light emitted by the one or more light-emitting elements. The controller may be responsive to a signal from a photosensor and/or an occupancy sensor.

In another aspect, embodiments of the invention feature a method of illuminating an interior space with harvested sunlight and artificial light. Sunlight is harvested external to the interior space, and the harvested sunlight is guided to the interior space via total internal reflection. At least a portion of the harvested sunlight is extracted such that it is emitted into the interior space. A portion of the extracted sunlight is blocked or reflected by one or more light-emitting elements. Artificial light is emitted into the interior space via the one or more light-emitting elements.

Embodiments of the invention include one or more of the following in any of a variety of combinations. At least one (or even all) of the light-emitting elements may include or consist essentially of a light-emitting diode (e.g., a substantially unpackaged light-emitting diode die). The amount of the harvested sunlight may vary over time, thereby varying the amount of the extracted sunlight. The intensity of the artificial light may be controlled to compensate for the varying amount of extracted sunlight (e.g., to maintain a substantially constant total light intensity in the interior space over time). The intensity of the artificial light may be controlled in response to the presence of an occupant in the interior space.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. As used herein, the terms "substantially" and "approximately" mean±10%, and in some embodiments, ±5%. As used herein, the terms "pattern" and "geometric pattern" refer to a geometric arrangement, which may be random, pseudo-random, or regularly or semi-regularly repeating.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
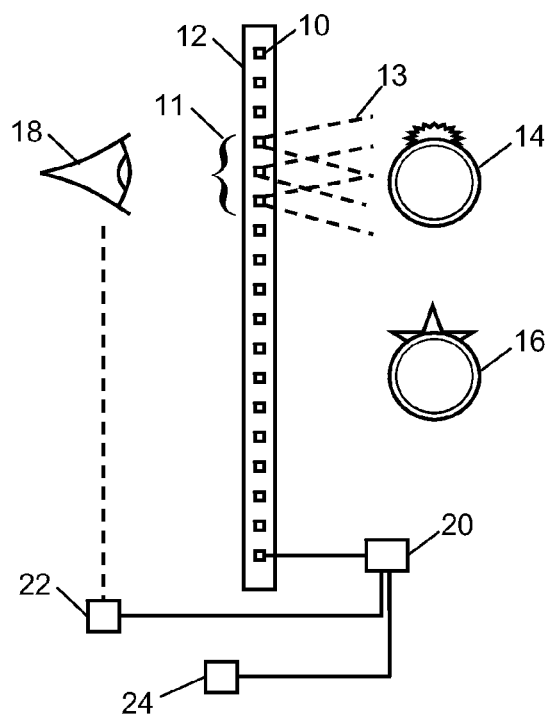
FIG. 1 is a schematic sectional view of an array of light sources interposed between a viewer and objects to be observed in accordance with various embodiments of the invention.

In various embodiments of the present invention, and as shown in FIG. 1, an array of LEEs 10 is mounted in or on a transparent substrate 12. The array of LEEs may be a regular square, triangular, hexagonal, rectangular array, or other regular array, or a random or semi-random array. In some embodiments, there may only be one LEE 10 in the array. In another embodiment there may be multiple arrays, one for each eye of an observer or "eye" (i.e., sensor) of a machine vision system.

The substrate 12 is generally positioned between an eye 18 of an observer and objects 14, 16 to be viewed. The eye 18 may also represent an observer, such as a machine vision system or variable source of natural light, rather than a human eye. Light 13 is emitted from a group 11 of one or more LEEs 10 in order to illuminate object 14. Light 13 is emitted in the general direction or range of directions away from the observer's eye 18. The group 11 of LEEs 10 that are energized is generally positioned on or close to the axis of the line of sight of the observer. The result is that the beam of light created by the group 11 of LEEs 10 is approximately coaxial with the line of sight of the viewer. (The beam is in general divergent.) The viewer cannot cast a shadow from the LEE sources 10, and the number and positioning of the illuminated LEE sources may be optimized to minimize shadowing effects from the observed objects themselves.

The array of LEEs 10 may be driven by a controller 20, which may have an input from a sensor 22 that detects the position of the observer 18. Using the input from the position sensor 22, the controller 20 may cause only the LEEs 11 in the vicinity of the observer to illuminate, and thus the object 16 situated away from the observer 18 may not be illuminated. The group 11 of LEEs that is illuminated may form a square array, an approximately circular array, a rectangular array, a hexagonal array, an annular array, or any other shape array. It may be the case that the group 11 has only a single LEE to be illuminated.

In addition to or instead of the position sensor 22, various embodiments of the invention incorporate a photosensor 24, which may be connected to the controller 20. If there is sufficient light (such as, for example, daylight), the controller 20 may be configured to not illuminate the light sources 10, or to illuminate them at less than maximum power.

The positional sensor 22 and photosensor 24 are optional. If they are not present, the array of LEEs 10 may be all energized at the same time, or their intensity may be controlled by a dimmer switch. The sensor(s) 22, 24 may be positioned in or on the unit having the array of LEEs 10, or they may be positioned separate from it but in the same room. Rather than sensing specific observer position, the sensor 22 may simply be an occupancy sensor.

The control unit 20 may be configured to change the aggregate color of the light emitted by the LEEs 10. For example, if the array 10 includes LEEs that emit different wavelengths, then the relative extent to which each wavelength group is driven determines the color of the light output. This color may be changed in response to observer occupancy and/or position. The color temperature of the array of LEEs 10 may also be controlled. For example, the color temperature may be 6500K (cool white), 2900K (warm white), or any color temperature within this range. Of course, other color temperatures are possible.

The following is a description of a plurality of exemplary embodiments of the present invention for illuminating objects with barely visible intervening light sources, or in other words, sources that only block, or partially block by way of absorption, a small fraction of the field of view.

Figure 2:
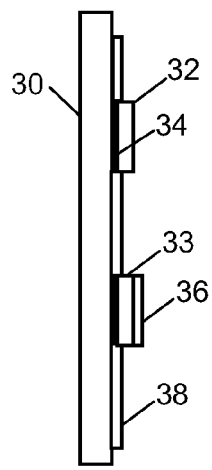
FIGS. 2-5 are simplified cross-sections of light sources mounted on a transparent substrate in accordance with various different embodiments of the invention.

Referring to FIG. 2, two different embodiments for mounting LEEs 32, 33 onto a substrate 30 are shown. In one case, the upper LEE 32 with a reflective rear face 34 is mounted onto the transparent substrate 30, which may be, e.g., glass or plastic. Examples for the substrate 30 are soda-lime glass, fused silica, polymethylmethylacrylate (PMMA), polystyrene, polyethylene terephthalate (PET), polyester, and polycarbonate. A reflective surface or layer 34 serves to reflect light emitted by the LEE 32 that may otherwise be emitted towards the viewer.

In the other case illustrated in FIG. 2, the lower LEE 33, again with a reflective rear surface 34, is mounted onto the transparent substrate 30; in this case, the output surface of the LEE 33 is covered with a layer 36 that may include or consist essentially of, e.g., an anti-reflection coating, light-extraction structure, or a photonic band gap crystal layer. The layer 36 typically serves to increase the efficiency with which light is extracted from the LEE device 33. The divergence of the light output beam may also be controlled by the choice of layer 36.

As shown, one or more electrical connections 38 serve to supply power to the LEE elements 32, 33. The electrical connections 38 may be formed using indium tin oxide (ITO) or other transparent or translucent electrically conductive material. Other such conductors may be, for example, aluminum-zinc oxide, carbon nanotubes, graphene, conductive polymer films, or thin electrical traces including, for example, gold or silver nanoparticle inks that have been deposited on the substrate 30 and subsequently sintered to improve conductivity.

Figure 3:
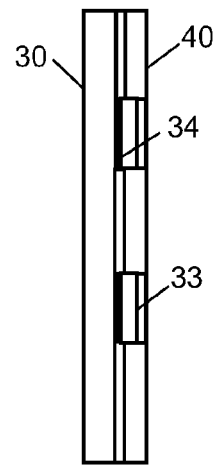
Figure 4:
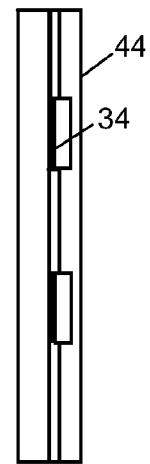

FIG. 3 depicts two LEEs, with reflective rear layers 34 and extraction layers 36, mounted on transparent substrate 30, with an added transparent planarization layer 40, which may be optical epoxy. The planarization layer generally reduces or substantially eliminates non-planarities or surface steps associated with the mounting of the LEEs on the substrate 30. Similarly, FIG. 4 shows LEEs with reflective rear layers 34 mounted on transparent substrate 30 with an added transparent encapsulation layer 44, which may be optical epoxy. The encapsulation layer 44 may protect the LEEs from environmental exposure and/or damage.

Figure 5:
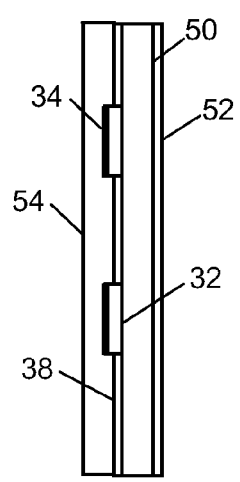

In accordance with various embodiments of the invention, the LEEs emit light toward the transparent substrate on which they are mounted, i.e., are mounted "face-down." FIG. 5 shows LEEs 32 mounted with their light-output surfaces adjacent to transparent substrate 50. Electrical conductors 38 supply current to the LEEs 32 and an encapsulation layer 54 may be added on the observer side of the assembly. The substrates and/or assemblies may be flexible or rigid. If rigid, they may be substantially planar or permanently curved.

As may be appreciated, the above are just a few of the numerous different configurations possible for forming a transparent LEE assembly in accordance with embodiments of the present invention. Those skilled in the art will be able to identify other configurations that do not depart from the scope of the present invention. While reference has been made to LEEs, other small-sized electronic components may also be used, such as sensors, photovoltaic cells, transistors, etc. These may be used with or without accompanying LEEs.

Figure 6:
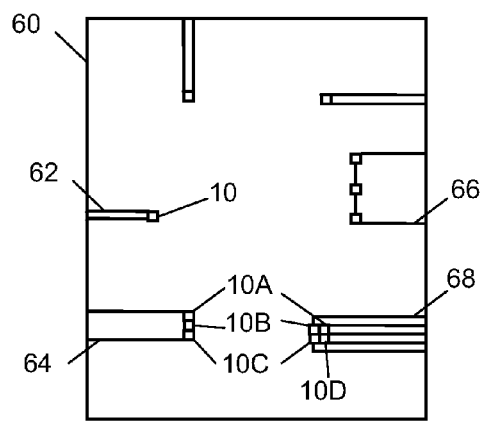
FIG. 6 is a plan-view schematic of various different wiring configurations for light sources in accordance with various embodiments of the invention.
Figure 7:
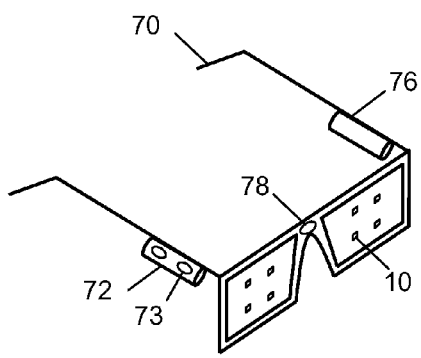
FIGS. 7-12 depict exemplary objects incorporating light-emitting elements on substantially transparent substrates for providing illumination in a variety of applications in accordance with various embodiments of the invention.

FIG. 6 shows a top view of a transparent LEE assembly with various exemplary electrical connection arrangements. On the same substrate 60, LEEs 10 are mounted in different positions and groupings. For example, an electrical conductor 62 connects to a single LEE 10, while an electrical conductor 64 connects to a block of three LEEs, such as a red LEE 10A, a green LEE 10B, and a blue LEE 10C, which are all connected in series or parallel, but not configured for individual control thereof (and are therefore all controlled together as a single unit). As shown, an electrical conductor 66 connects to a group of three physically separated LEEs connected in series that may be the same type or different types of LEE. An electrical conductor 68 connects to a block of four LEEs, such as a red LEE 10A, a green LEE 10B, a blue LEE 10C, and an amber LEE 10D, which are all connected separately for individual control thereof FIG. 7 depicts a pair of spectacles 70 with LEEs 10 mounted in or on the lenses.

A power supply such as a battery 76 may included and mounted on one arm of the spectacles (for example), and a control unit 72 may also be included (and mounted on another arm, for example). The control unit 72 may have user controls 73, such as an on/off switch and/or color control and/or dimming switch. In other embodiments, illumination is automated. For example, a sensor 78 may detect ambient lighting levels and energize the LEEs 10 if the ambient light level falls below a certain threshold. Alternately, the sensor 78 may be a proximity sensor that detects when the wearer of the spectacles 70 is close to an object to be observed, and the controller 72 may as a result energize the LEEs 10 only when the spectacles 70 are close to an object to be observed. The spectacles 70 may be, e.g., night-vision goggles, and the LEEs 10 may include or consist essentially of red LEEs to provide hands-free illumination without affecting night vision. In another similar embodiment, the spectacles may be a surgeon's head-mounted illuminator for surgical procedures where shadowless illumination is beneficial. In a preferred embodiment, the correlated color temperature and/or the spectral composition of the emitted light may be controllable in order to highlight differences in biological materials.

Figure 8:
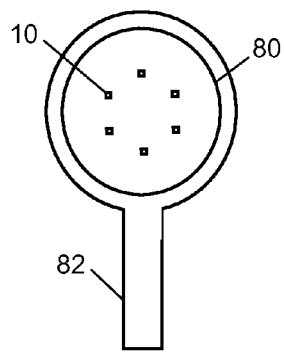
Figure 9:
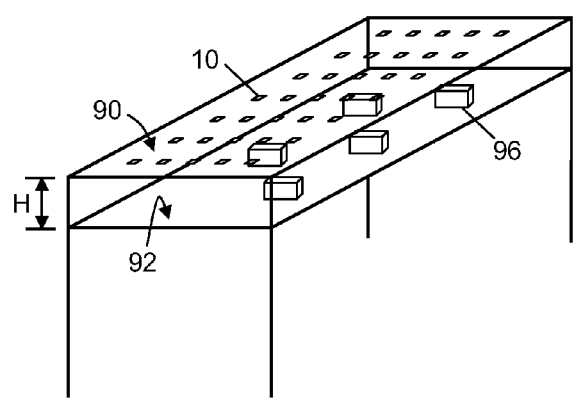

FIG. 8 shows a magnifying glass with LEEs 10 on or embedded in the lens 80. A control unit and power supply may be enclosed in the handle 82, for example. The power supply may be a battery, an ultracapacitor, a thermoelectric device, a photocell, a clockwork dynamo or a hand-driven dynamo. FIG. 9 shows a low-profile display cabinet (i.e., the linear dimensions of the upper transparent surface 90 are large compared to the distance H between the upper surface 90 and the base 92 of the cabinet). In the depicted embodiment, the profile of the display cabinet permits the LEEs 10 to be located close to the objects 96 that are to be illuminated. The result is that the objects 96 can be effectively illuminated, with little or no shadow formation, and with little or no apparent nearby source of illumination.

Figure 10:
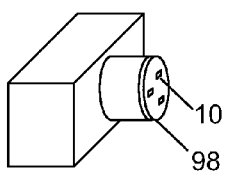
Figure 11:
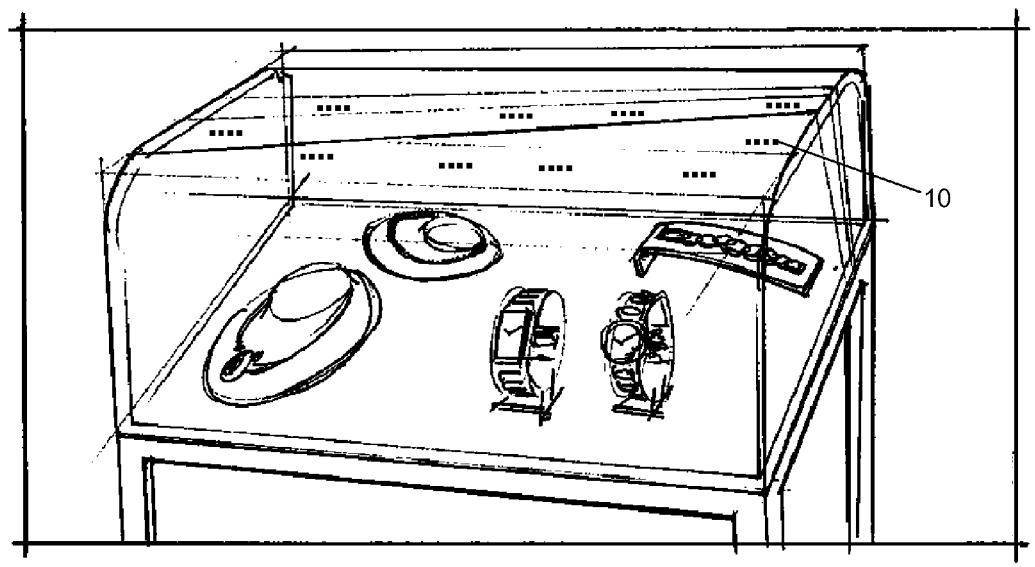

FIG. 10 shows a LEE assembly configured as a camera lens filter for macrophotography, replacing the need for, e.g., a photographic ring light. In a preferred embodiment, the LEEs 10 are configured for high-current pulsing to function as a camera flash. FIG. 11 depicts a display cabinet with curved transparent surfaces that may be fitted with LEE illumination assemblies in accordance with embodiments of the invention. In the illustrated example, the top surface and the four side walls may be largely transparent. Optionally, both the top surface and the side walls may be fitted with LEEs 10.

Figure 12:
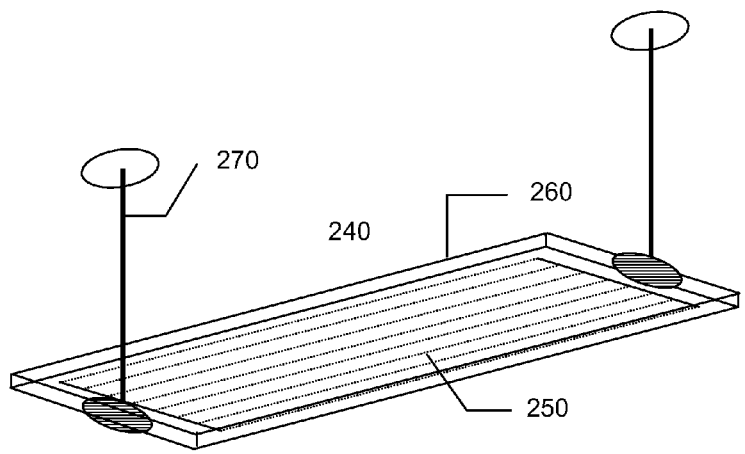

FIG. 12 shows a suspended direct-indirect luminaire 240 that includes one or more rows of LEEs 250 mounted with electrical connections on a substantially transparent substrate 260. As shown, the substrate 260 is suspended from a ceiling by pendants 270. The LEEs 250 may emit light downwards, upwards, or a combination thereof. The substrate 260 may incorporate molded or embossed optical elements such as refractive or diffractive lenses and reflectors to direct at least a portion of the light emitted by the LEEs 250 in one or more preferred directions.

In other embodiments, such transparent LEE assemblies are utilized in refrigeration units, thereby reducing the amount of unnecessary heat that the refrigeration unit must dissipate. The lighting efficiency of such refrigerated units is also generally increased because the efficiency of LEEs such as LEDs is higher at lower temperatures. For example, the contents of a freezer or refrigerator may be illuminated by LEE sources in the windows of the freezer or refrigerator. As the windows are generally cooler than the air exterior to the freezer, the efficiency of light production is higher. View ports in optical cryostats may also be fitted with transparent LEE assemblies. In other embodiments, LEEs are mounted on glass or plastic transparent substrates used in a machine vision illuminator.

As mentioned above, embodiments of the present invention may also feature hybrid illumination systems that include a combination of daylight harvesting and artificial lighting from LEEs. In one embodiment, one or more LEEs, e.g., a planar array of LEEs, mounted on an optically transparent substrate is mounted inside a prismatic light guide of a sunlight-harvesting system (for example, like that described in U.S. Pat. No. 4,720,170, the entire disclosure of which is incorporated by reference) without substantially degrading its optical performance. In an alternate embodiment, one or more LEEs, e.g., a planar array of LEEs, mounted on a diffusely reflective opaque white substrate serves as a light extractor for the light guide. In yet another embodiment, one or more LEEs, e.g., a planar array of LEEs, are mounted on an outer surface of the light guide, thereby blocking a portion of the light emitted therefrom but substantially reducing or even eliminating various optical losses that may occur in LEEs mounted inside the light guide.

In various embodiments of the invention, the light guide may include or consist essentially of a prismatic waveguide that confines (by, e.g., total internal reflection), guides, and enables directed extraction of light (e.g., sunlight). For example, the waveguide may be similar to those described in U.S. Pat. No. 5,661,839, the entire disclosure of which is incorporated by reference. The light guide may be substantially cylindrical and hollow, and may be connected to other components of a daylight-harvesting system, e.g., a solar concentrator or one or more reflectors, that are situated, for example, on a roof or outside wall of a building exposed to sunlight. In other embodiments the light guide has a cross-section that is polygonal, e.g., substantially rectangular or substantially trapezoidal.

Figure 13:
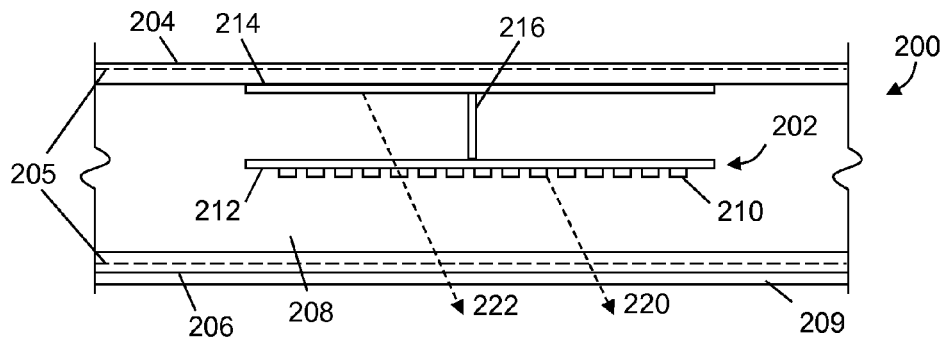
FIGS. 13-15 are simplified cross-sectional views of various embodiments of the invention incorporating arrays of light-emitting elements supplementing a light guide of a daylight-harvesting system.

In FIG. 13, a portion of a prismatic light guide 200 is shown with a rear section 204, an exit section 206, and an interior space 208. In a given portion of the light guide 200, some or all of the inner and outer walls of the light guide 200 may be in octature, or they may be in other suitable configurations, with some portions allowing for guided light to escape and others preventing it. As known to those of skill in the art and as set forth in U.S. Pat. No. 4,260,220 (the entire disclosure of which is incorporated by reference), inner and outer surfaces of a portion of a light guide are in octature when (i) the inner surfaces are all either parallel or perpendicular to each other, (ii) the outer surfaces are all either parallel or perpendicular to each other, and (iii) the inner surfaces are at a 45° angle to the outer surfaces. As a result, light is substantially losslessly confined therein. Thus, the exterior surface(s) (corresponding to at least a portion of the circumference) of the light guide 200 may be corrugated, "valleys" of which are indicated as valleys 205 in FIG. 13. The valleys 205 may be part of an optical film 209 disposed on surfaces 204 or 206 that, e.g., diffuses and/or redirects at least a portion of light extracted from light guide 200. In an embodiment of the invention, a light source 202 (which is preferably electric) is suspended or mounted inside the light guide 200. The light source 202 includes or consists essentially of, e.g., an optically transparent substrate 212 such as glass or polymethylmethylacrylate (PMMA), on which are mounted an array of LEEs 210. The LEEs 210 may have current requirements sufficiently low such that the conductive traces connecting them to a power supply are much narrower than the spacing between the LEEs 210. Consequently, the conductive traces absorb, block, or reflect an insignificant amount of light that may be incident upon the substrate 212.

The light source 202 may be suspended by one or more pillars 216, which may be transparent or translucent (or equivalently, by one or more cables), and electrical connections may extend up the side or inside of the pillar 216 to a suitable power source exterior to the light guide 200. Connecting rods may be oriented sideways or at an angle, rather than vertically, or they may be positioned below or at the side of the light source 202.

An extractor strip 214 extracts a portion 222 of the totally internally reflected sunlight from the light guide 200. The extractor strip 214 may include or consist essentially of an array of optical elements (such as protrusions or diffusive dots) that interrupts the total internal reflection of light confined in light guide 200 and thus facilitates extraction of the light through surface 206. Similarly, light 220 emitted by LEEs 210 is also extracted from the light guide 200. Light extractor strips or similar features may also be present in or on light output surface 206. Consequently, the light in the light guide 200, which originates from ambient sunlight and/or LEEs 210, is ultimately emitted from the surface 206.

In a further embodiment shown in FIG. 14, the light source 202 is mounted on or below the surface 206 of the light guide 200. The extractor strip 214 extracts a portion 222 of the totally internally reflected sunlight from the light guide 200 that is subsequently transmitted through transparent substrate 212, while LEEs 210 emit light 220 to the space to be illuminated. In an embodiment, an additional protective covering may be used to protect the LEEs 212 from environmental exposure. As mentioned above, the configuration of FIG. 14 may diminish optical losses in light 220, as such light from the LEEs 210 need not travel through one or more surfaces of the light guide 200. Although the LEEs 210 typically block a portion of the sunlight extracted form the light guide 200, generally the small geometry of the LEEs 210 enables any losses resulting from such blockage to be small.

Figure 15:
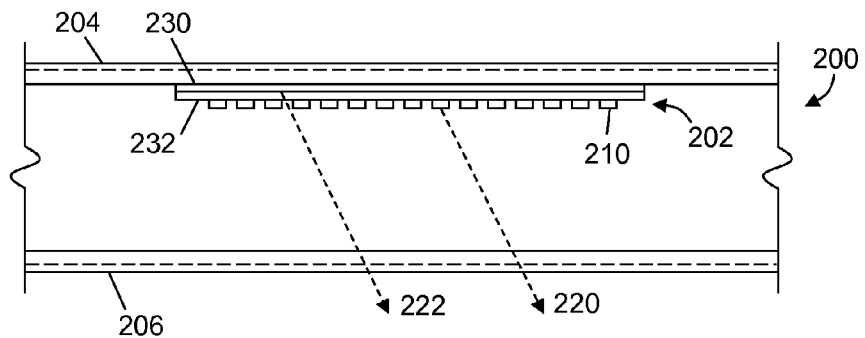

As shown in FIG. 15, the electric light source 202 may be mounted inside the light guide 200 and may incorporate an opaque substrate 230 such as, e.g., fiber-reinforced epoxy. The substrate 230 may be coated or laminated with a diffuse white reflective material 232 such as multicellular polyethylene terephthalate (MCPET) as manufactured by Furukawa Electric. Thus, the substrate 232 functions as an extractor strip to extract a portion 222 of the totally internally reflected sunlight from the light guide 200. Light 220 is also emitted from the light guide 200 by the electric light source 210.

Figure 16:
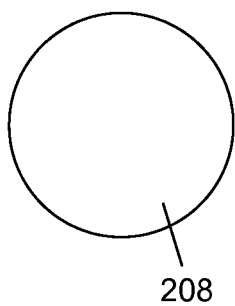
FIGS. 16 and 17 are cross-sectional views of light guides in accordance with various embodiments of the invention.
Figure 17:
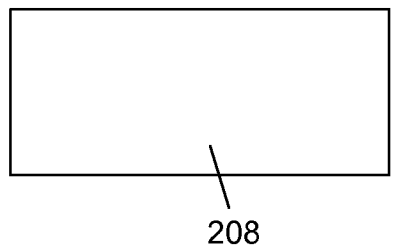

FIGS. 16 and 17 depict cross-sectional views of the interior space 208 of light guides 200 in accordance with various embodiments of the present invention (other details of the light guides 200 are not depicted for clarity). As shown, the cross-section of a light guide 200 may be, for example, substantially circular (FIG. 16) or substantially rectangular (FIG. 17).

Figure 14:
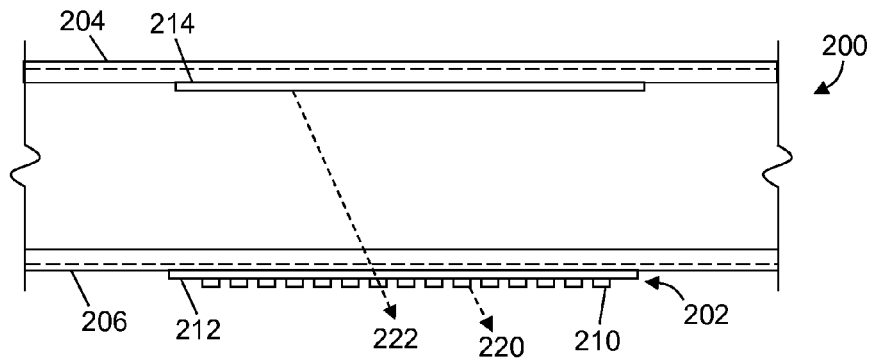

The light sources depicted in FIGS. 2-6 may also be used in alternate embodiments of the light-guide applications described in relation to FIGS. 13-15. As in some of the above-described embodiments, light-guide-incorporating embodiments may include a controller 20 for controlling the illumination level of the light source 202. For example, the intensity of the light emitted by the light source 202 may be controlled, based on a photosensor 24 (that may be disposed on or proximate light guide 200) in order to compensate for varying levels of sunlight extracted from light guide 200. Thus, the total illumination level of light emitted in the aggregate by light guide 200 and light source 202 may be substantially constant over time, even as the amount of available sunlight changes. As described above, the controller 20 may also be responsive to position/occupancy sensor 22, and thus may control light source 202 to only emit light when an occupant is present or nearby, regardless of the level of sunlight being extracted from light guide 200.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A hybrid illumination system comprising:
a light guide for guiding sunlight from a first region of the light guide to a second region thereof having an emission surface, the light guide confining the sunlight via total internal reflection, and at least a portion of the sunlight being extracted from the light guide to exit through the emission surface;
a substantially transparent substrate disposed on the emission surface;
disposed within the light guide, an extraction element for disrupting the total internal reflection of sunlight confined in the light guide, thereby extracting sunlight through the emission surface; and
one or more light-emitting elements for emitting artificial light, the one or more light-emitting elements being disposed (i) over the emission surface and (ii) on the substantially transparent substrate, thereby blocking or reflecting at least a portion of the sunlight extracted from the light guide.

2. The system of claim 1, wherein the substrate comprises at least one of glass or a substantially transparent polymeric material.

3. The system of claim 2, wherein the substrate comprises a substantially transparent polymeric material, the polymeric material comprising at least one of polymethylmethacrylate, polystyrene, polyester, or polycarbonate.

4. The system of claim 2, wherein the substrate comprises a substantially transparent polymeric material, the polymeric material comprising polyethylene terephthalate.

5. The system of claim 1, wherein the light guide comprises, disposed on the emission surface, an optical film for at least one of diffusing or redirecting extracted sunlight.

6. The system of claim 1, wherein a cross-section of the light guide is substantially circular or substantially rectangular.

7. The system of claim 1, wherein at least one of the light-emitting elements comprises a light-emitting diode.

8. The system of claim 1, further comprising a controller for controlling an intensity of the artificial light emitted by the one or more light-emitting elements.

9. The system of claim 8, further comprising at least one of a photosensor or an occupancy sensor, the controller being responsive to a signal therefrom.

10. The system of claim 1, wherein the extraction element comprises a plurality of optical elements.

11. The system of claim 10, wherein the optical elements comprise at least one of protrusions or diffusive dots.

12. A method of illuminating an interior space with harvested sunlight and artificial light, the method comprising:
harvesting sunlight external to the interior space;
guiding the harvested sunlight to the interior space via total internal reflection in a light guide having an emission surface, the emission surface having a substantially transparent substrate thereon;
extracting at least a portion of the harvested sunlight such that it is emitted into the interior space, a portion of the extracted sunlight being blocked or reflected by one or more light-emitting elements disposed on the substantially transparent substrate; and
emitting artificial light into the interior space via the one or more light-emitting elements.

13. The method of claim 12, wherein at least one of the one or more light-emitting elements comprises a light-emitting diode.

14. The method of claim 12, wherein an amount of the harvested sunlight varies over time, thereby varying an amount of the extracted sunlight, and further comprising controlling an intensity of the artificial light to compensate for the varying amount of extracted sunlight.

15. The method of claim 12, further comprising controlling an intensity of the artificial light in response to the presence of an occupant in the interior space.

16. The method of claim 12, wherein the substrate comprises at least one of glass or a substantially transparent polymeric material.

17. The method of claim 16, wherein the substrate comprises a substantially transparent polymeric material, the polymeric material comprising at least one of polymethylmethacrylate, polystyrene, polyester, or polycarbonate.

18. The method of claim 16, wherein the substrate comprises a substantially transparent polymeric material, the polymeric material comprising polyethylene terephthalate.

19. The method of claim 12, wherein the at least a portion of the harvested sunlight is extracted via an extraction element.

20. The method of claim 19, wherein the extraction element comprises a plurality of optical elements.

21. The method of claim 20, wherein the optical elements comprise at least one of protrusions or diffusive dots.

* * * * *